(12) United States Patent
Rashti et al.

(10) Patent No.: US 12,225,861 B2
(45) Date of Patent: *Feb. 18, 2025

(54) METHOD AND SYSTEMS FOR INDOOR FARMING

(71) Applicant: Vertikal Green Tech Ltd., Vancouver (CA)

(72) Inventors: Bahram Rashti, Vancouver (CA); Shahram Rashti, Pitt Meadows (CA)

(73) Assignee: Vertikal Green Tech Ltd., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,203

(22) Filed: Dec. 22, 2023

(65) Prior Publication Data

US 2024/0130302 A1    Apr. 25, 2024

Related U.S. Application Data

(63) Continuation of application No. 18/076,165, filed on Dec. 6, 2022, now Pat. No. 11,889,804, which is a continuation of application No. 17/959,823, filed on Oct. 4, 2022, now abandoned, which is a continuation of application No. PCT/CA2022/050404, filed on Mar. 17, 2022.

(60) Provisional application No. 63/163,573, filed on Mar. 19, 2021.

(51) Int. Cl.
*A01G 9/24* (2006.01)
*A01G 9/20* (2006.01)

(52) U.S. Cl.
CPC ............... *A01G 9/249* (2019.05); *A01G 9/20* (2013.01)

(58) Field of Classification Search
CPC .................................. A01G 9/20; A01G 9/249
See application file for complete search history.

(56) References Cited

U.S. PATENT DOCUMENTS

| | | | | |
|---|---|---|---|---|
| 5,012,609 A | * | 5/1991 | Ignatius | A01G 7/045 47/1.01 R |
| 10,440,900 B1 | | 10/2019 | Higgins et al. | |
| 10,694,680 B2 | | 6/2020 | Krijn et al. | |
| 11,304,376 B2 | * | 4/2022 | McClear | A01G 7/045 |

(Continued)

FOREIGN PATENT DOCUMENTS

| | | |
|---|---|---|
| CN | 109548529 A | 4/2019 |
| KR | 102040328 B1 | 11/2019 |

(Continued)

*Primary Examiner* — Monica L Perry
*Assistant Examiner* — Aaron M Rodziwicz
(74) *Attorney, Agent, or Firm* — Roni M. Jones; Oyen Wiggs Green & Mutala LLP (57) ABSTRACT

A method of providing light to plants. The method comprises providing a plurality of plants within a room, grouping each plant of the plurality of plants into one of a plurality of groups of plants based at least in part on a desired total light integral ("TLI") for each of the plurality of plants and providing the corresponding desired TLI to each plant of the plurality of plants by sequentially providing light to each of the plurality of groups of plants during a time period. For each group of plants, each plant has a substantially similar photoperiod and a sum of the photosynthetic photon flux densities ("PPFDs") of all plants in the group of plants is substantially similar.

21 Claims, 3 Drawing Sheets

(56) References Cited

U.S. PATENT DOCUMENTS

| | | |
|---|---|---|
| 2010/0031562 A1 | 2/2010 | Browne et al. |
| 2010/0244724 A1* | 9/2010 | Jacobs .................. H05B 45/32 |
| | | 315/253 |
| 2013/0139437 A1* | 6/2013 | Maxik .................. A01G 7/045 |
| | | 47/58.1 LS |
| 2014/0069002 A1 | 3/2014 | Morgan et al. |
| 2014/0152194 A1* | 6/2014 | Beyer .................. H05B 45/20 |
| | | 315/294 |
| 2015/0128488 A1 | 5/2015 | Casper et al. |
| 2015/0198321 A1 | 7/2015 | Druchinin |
| 2015/0342125 A1* | 12/2015 | Krijn ...................... A01G 7/045 |
| | | 315/297 |
| 2015/0351325 A1 | 12/2015 | Shelor et al. |
| 2016/0088802 A1* | 3/2016 | Nicole .................. H05B 47/11 |
| | | 315/297 |
| 2019/0059241 A1* | 2/2019 | Bogner .................. A01G 9/249 |
| 2019/0110341 A1 | 4/2019 | Barbosa |
| 2019/0133052 A1* | 5/2019 | Carson .................... A01G 7/02 |
| 2019/0335675 A1* | 11/2019 | Ngo ...................... F21V 23/007 |
| 2020/0053854 A1 | 2/2020 | Xu et al. |
| 2020/0093072 A1 | 3/2020 | Pickett et al. |
| 2020/0170197 A1 | 6/2020 | Kajiyama |
| 2020/0178473 A1 | 6/2020 | Ashdown et al. |
| 2020/0184153 A1 | 6/2020 | Bongartz et al. |
| 2020/0352113 A1* | 11/2020 | Canipe ................. A01G 9/1423 |
| 2021/0000024 A1 | 1/2021 | Voelz et al. |
| 2021/0176934 A1* | 6/2021 | Su ........................ A01G 27/005 |
| 2022/0287246 A1* | 9/2022 | Westlind ............... A01G 7/045 |
| 2022/0289640 A1* | 9/2022 | Layton .................... A01G 9/20 |

FOREIGN PATENT DOCUMENTS

| | | |
|---|---|---|
| WO | 2014037852 A1 | 3/2014 |
| WO | 2016147195 A1 | 9/2016 |

\* cited by examiner

METHOD AND SYSTEMS FOR INDOOR FARMING

REFERENCE TO RELATED APPLICATIONS

This application is a continuation of U.S. application Ser. No. 18/076,165 filed 6 Dec. 2022, which is a continuation application of U.S. application Ser. No. 17/959,823 filed 4 Oct. 2022, which is a continuation of Patent Cooperation Treaty (PCT) application No. PCT/CA2022/050404 having an international filing date of 17 Mar. 2022, which in turn claims priority from, and for the purposes of the United States the benefit of 35 USC § 119 in respect of, U.S. application No. 63/163,573 filed 19 Mar. 2021. All of the applications in this paragraph are hereby incorporated herein by reference.

TECHNICAL FIELD

This invention relates generally to indoor growth of plants and in particular to methods for providing light to plants for indoor growth.

BACKGROUND

While plants have traditionally been grown outdoors, there is a growing trend toward indoor growth of plants. As compared to traditional farming, indoor farming may use less land. Indoor farming allows for "vertical farming" in which crops can be stacked vertically within a grow room, thereby reducing the geographic footprint as compared to traditional farming. Indoor farming may also facilitate a reduction in the use of pesticides and other potentially harmful chemicals by allowing for a pest-free environment.

In the absence of sunlight, indoor farming operations may employ artificial lights.

Ideal growing conditions vary according to plant varietal. For example, for some plants, it may be ideal for a plant to receive between approximately ten and 18 hours of light while requiring six to 14 hours of darkness in a 24 hour cycle. The daily light integral ("DLI") may be used to understand and evaluate the quantity of light a plant is receiving. DLI is a cumulative measure of photosynthetically active radiation ("PAR"). DLI may be defined as the quantity of photosynthetically active photons received by plants per area per day (with units of, for example, $mol/m^2/day$). DLI may be increased by increasing the photoperiod (e.g. the period of time during which light is provided to the plant) and/or the photosynthetic photon flux density ("PPFD") (e.g. the amount of light photons that a plant receives per area per unit of time).

Once the DLI for a plant is determined, a lighting schedule (e.g. photoperiod and PPFD) may be chosen to achieve the desired DLI. Typically, all plants within a grow room are on the same schedule. However, since lights produce heat, maintaining all plants within a grow room on the same lighting schedule leads to large temperature fluctuations. For example, maintaining all plants within a grow room on the same light schedule may lead to periods of time where the grow room overheats (because all lights are turned on) and periods of time where the grow room may drop below a desired temperature (because all lights are turned off). Temperature monitoring sensors and heating/cooling systems may be employed to counteract these temperature fluctuations. However, such systems increase the cost to build and operate a grow room.

There is a general desire to provide systems and methods for growing plants indoors with reduced energy consumption and/or reduced cost. There is a general desire to provide systems and methods for growing plants indoors without temperature management systems (e.g. temperature measurement and/or heating/cooling systems) or with reduced reliance on such temperature management systems thereby allowing for less expensive and/or less sophisticated temperature management systems to be employed.

The foregoing examples of the related art and limitations related thereto are intended to be illustrative and not exclusive. Other limitations of the related art will become apparent to those of skill in the art upon a reading of the specification and a study of the drawings.

SUMMARY

One aspect of the invention provides a method of providing light (e.g. photosynthetically active photons) to plants. The method comprises providing a plurality of plants within a room, grouping each plant of the plurality of plants into one of a plurality of groups of plants based at least in part on a desired total light integral ("TLI") for each of the plurality of plants for a time period and providing the corresponding desired TLI to each plant of the plurality of plants by sequentially providing light to each of the plurality of groups of plants during the time period. For each group of plants, each plant has a substantially similar photoperiod and a sum of the photosynthetic photon flux densities ("PPFDs") of all plants in the group of plants is substantially similar.

In some embodiments, grouping each light of a plurality of lights into one of a plurality of groups of lights wherein each group of lights corresponds to one of the plurality of groups of plants within the room.

In some embodiments, each group of lights is arranged to provide photons substantially only to its corresponding group of plants.

In some embodiments, the method comprises maintaining a cumulative rate of heat output of the plurality of lights approximately constant during the time period. In some embodiments, the method comprises sequentially providing light to each of the plurality of groups of plants during a time period comprises sequentially turning on each group of lights of the plurality of groups of lights for a sub-period of time.

In some embodiments, at least some of the sub-periods of time overlap. In some embodiments, each of the sub-periods of time is approximately equal in magnitude. In some embodiments, at least two of the sub-periods of time have different magnitudes. In some embodiments, the combined magnitude of the sub-periods of time is approximately equal to the time period. In some embodiments, each group of lights is turned on only once during the time period. In some embodiments, one or more groups of lights is turned on multiple times during the time period.

In some embodiments, sequentially providing light to each of the plurality of groups of plants during a time period comprises selectively turning on a first group of lights of the plurality of groups of lights for a first sub-period of time while selectively turning off a second group of lights of the plurality of groups of lights for the first sub-period of time.

In some embodiments, sequentially providing light to each of the plurality of groups of plants during a time period comprises selectively turning on a first group of lights of the plurality of groups of lights for a first sub-period of time while selectively turning off a second group of lights of the plurality of groups of lights for the first sub-period of time and selectively turning on the second group of lights for a second sub-period of time while selectively turning off the first group of lights for the second sub-period of time.

In some embodiments, a plurality of lights are moveable between a plurality of locations and in each location the plurality of lights provides photos to a corresponding a group of plants of the plurality of plants within the room. In some embodiments, in each location, the plurality of lights are arranged to provide photons substantially only to the corresponding group of plants.

In some embodiments, a cumulative rate of heat output of the plurality of lights is maintained approximately constant during the time period by sequentially moving the plurality of lights to each location for a corresponding sub-period of time.

In some embodiments, the method comprises selectively moving the plurality of lights to a first location for a first sub-period of time and a second location for a second sub-period.

In some embodiments, each group of plants is separated from one or more other groups of plants in a substantially horizontal direction. In some embodiments, each group of plants is separated from one or more other groups of plants in a substantially vertical direction. In some embodiments, at least one of the groups of plants is arranged in vertically spaced apart rows of a rack in the room. In some embodiments, at least one of the groups of plants is arranged across rows of multiple racks. In some embodiments, at least one of the groups of plants is arranged across rows of multiple racks at the same height. In some embodiments, at least one of the groups of plants comprises plants of only a portion of a row of a rack. In some embodiments, at least one of the groups of plants comprises plants spaced apart throughout the room. In some embodiments, at least one of the groups of plants comprises plants spaced apart at various heights throughout the room.

In some embodiments, the room is separated into a plurality of sections in a horizontal plane and at least one of the groups of plants comprises plants located in each of the plurality of sections. In some embodiments, the at least one of the groups of plants comprises plants located at various heights in each of the plurality of sections.

In some embodiments, the time period is approximately equal to 24 hours.

In some embodiments, the room is arranged to substantially prevent external light from entering the room. In some embodiments, the room is arranged to substantially prevent external natural light from entering the room.

In some embodiments, for each group of plants, the photoperiods of the plants of said group vary by less than 20%. In some embodiments, for each group of plants, the photoperiods of the plants of said group vary by less than 10%. In some embodiments, for each group of plants, the photoperiods of the plants of said group vary by less than 5%. In some embodiments, the sum of the PPFDs for each group varies by less than 20%. In some embodiments, the sum of the PPFDs for each group varies by less than 10%. In some embodiments, the sum of the PPFDs for each group varies by less than 5%.

In some embodiments, a sum of the photoperiods of all of the groups of plants is approximately equal to or greater the time period. In some embodiments, the sum of the photoperiods of all of the groups of plants is within 10% of the magnitude of the time period. In some embodiments, wherein a sum of the photoperiods of all of the groups of plants is within 5% of the magnitude of the time period.

In some embodiments, grouping each of the plurality of plants into a plurality of groups of plants comprises nominally grouping each of the plurality of plants into a plurality of groups of plants.

In some embodiments, the plurality of plants comprises at least two different plant varietals. In some embodiments, the method comprises grouping each of the plurality of plants into the plurality of groups of plants based at least in part on plant varietal.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a method of delivering light (e.g. photosynthetically active photons) to a plurality of plants within a grow room of an indoor farming operation while maintaining a desired temperature range within (and throughout) the grow room.

Figure 1:
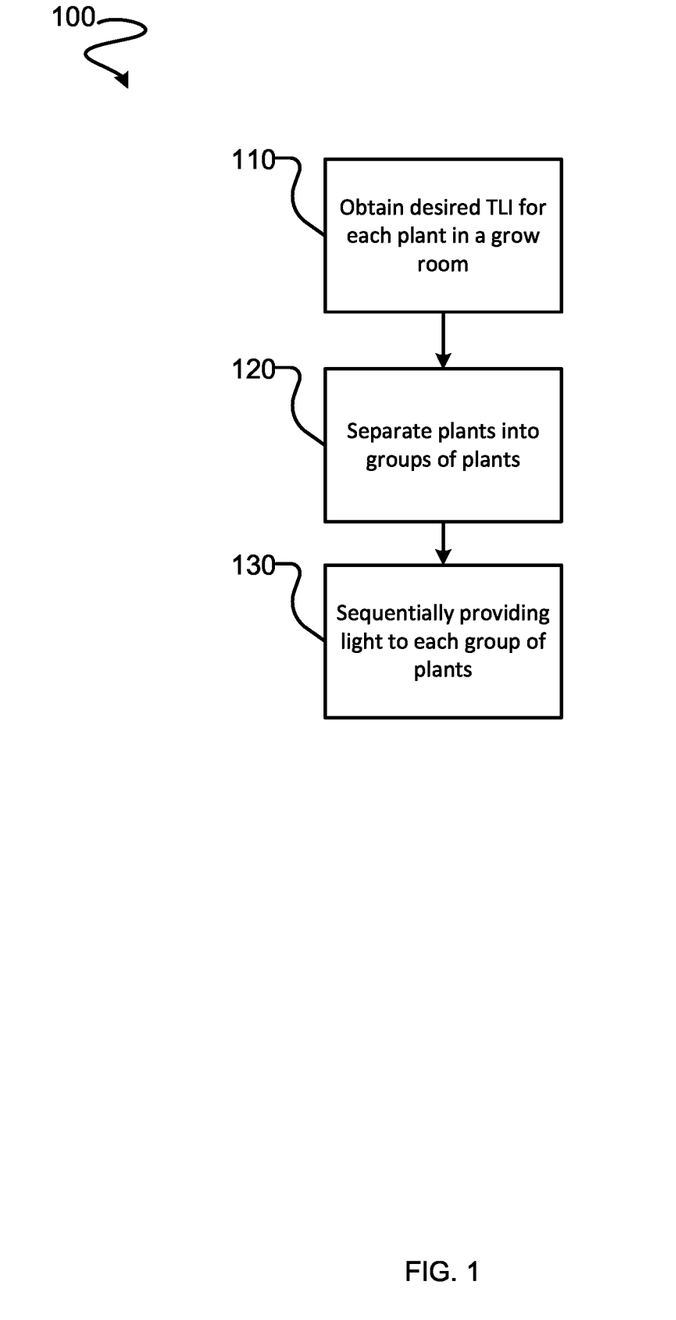
FIG. 1 depicts an exemplary, non-limiting method for providing light to plants according to one embodiment of the invention.

FIG. 1 depicts an exemplary method 100 of delivering light (e.g. photosynthetically active photons) to a plurality of plants within a grow room according to one embodiment of the invention. For the purpose of illustrating method 100, an exemplary non-limiting grow room 10 is described herein.

Figure 2:
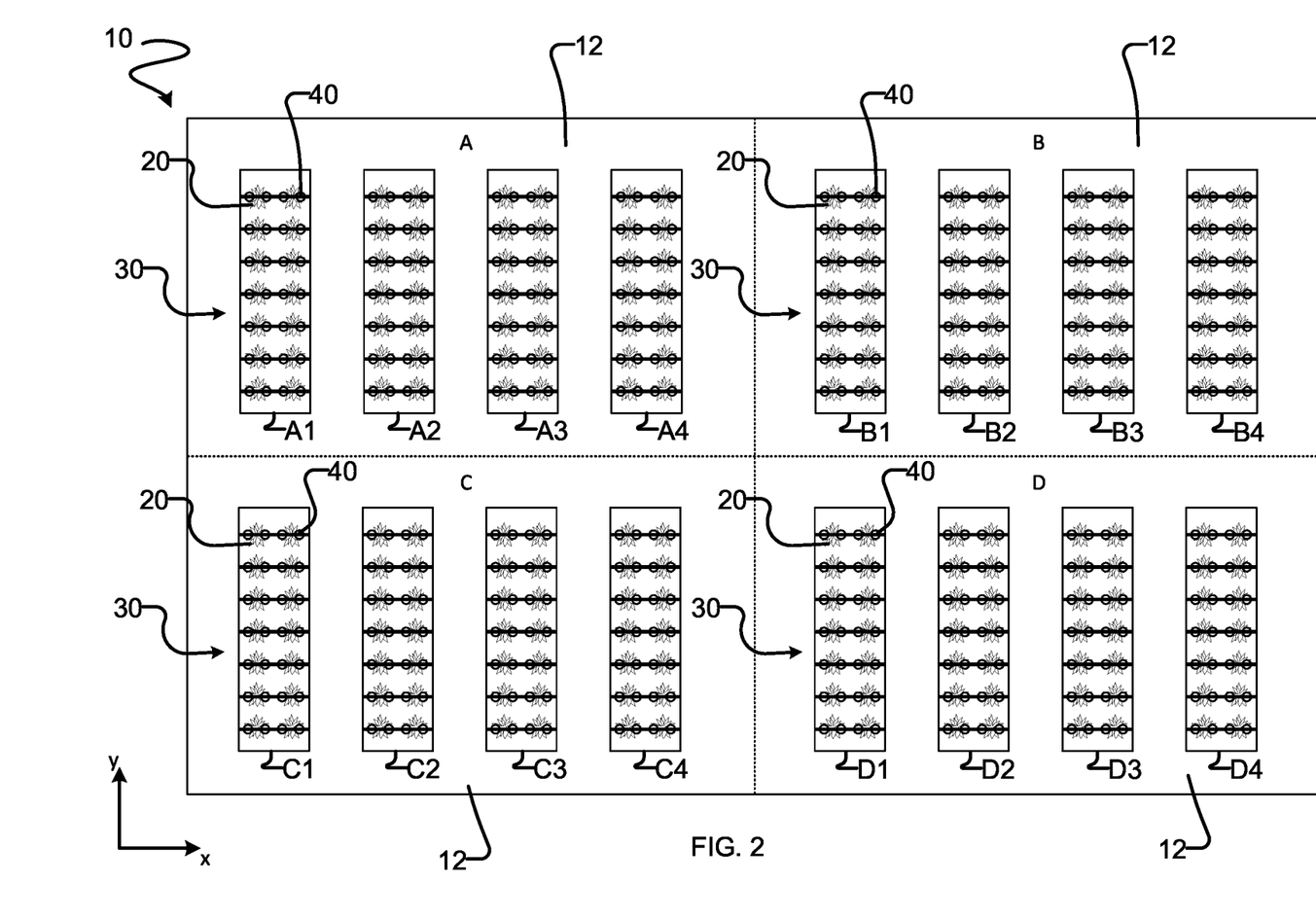
FIG. 2 is a schematic top plan view of an exemplary, non-limiting grow room according to one embodiment of the invention.
Figure 3:
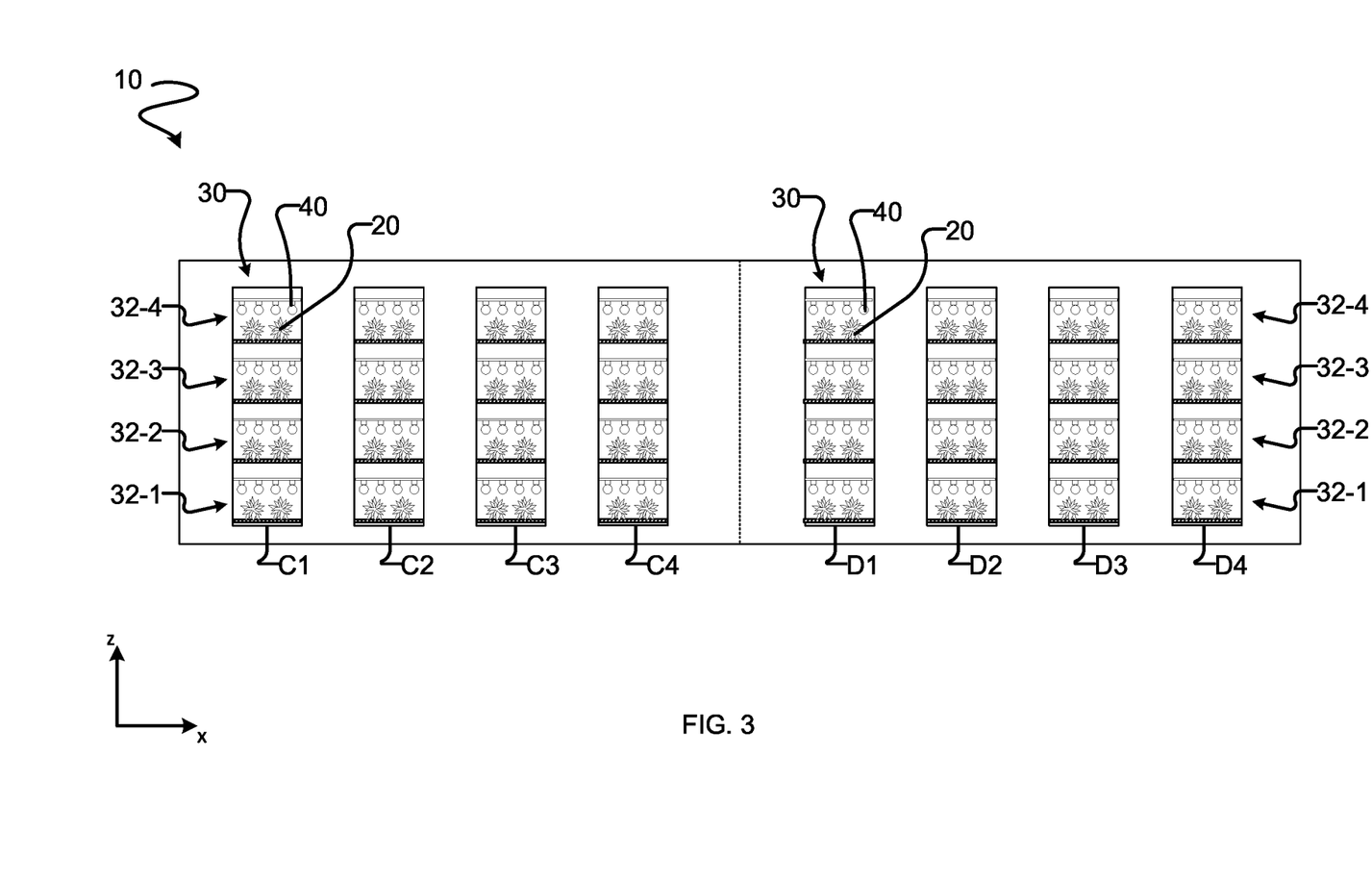
FIG. 3 is a schematic side plan view of the grow room of FIG. 2.

FIGS. 2 and 3 depict an exemplary non-limiting grow room 10. It should be understood that grow room 10 is presented for illustrative purposes. The description and drawings of grow room 10 provided herein are not intended to limit any aspects of a grow room for which method 100 may be employed. For example, the description and drawings herein are not intended to limit the grow room size, grow room shape, arrangement of racks within the grow room, arrangement of lights within the grow room, arrangement of plants within the grow room, choice of plant varietal within the grow room, etc.

As shown in FIGS. 2 and 3, a plurality of plants 20 are arranged on racks 30 within grow room 10. Racks 30 may be spaced apart horizontally (e.g. in the x-direction and/or y-direction). Lights 40 may be arranged to provide photons to each plant 20. Each light 40 may provide light to one or more plants 20.

Racks 30 may comprise any suitable racks. Each rack 30 may provide multiple rows 32 of plants 20 and lights 40.

This is not mandatory. Rows 32 may be stacked in the z-direction (e.g. vertically or substantially vertically) as shown in FIG. 3. In the illustrated embodiment, each rack 30 comprises four rows 32 (e.g. rows 32-1, 32-2, 32-3, 32-4). This is not mandatory. Each rack 30 may comprise any number of rows 32.

Plants 20 may comprise any suitable plants. Plants 20 may comprise plants of a single varietal or of multiple varietals. For example, plants 20 may comprise leafy greens (e.g. lettuce, spinach, kale, Swiss chard, etc.), spices (e.g. saffron, vanilla, mustard, etc.), herbs, microgreens, vegetables (e.g. mushrooms, eggplants, squash, peppers, cucumbers, etc.), fruit (e.g. berries, tomatoes, etc.), grains (rice, wheat, corn, barley, oat, sorghum, rye, quinoa etc.), cannabis, medicinal plants, sprouts, pumpkins, etc. Plants 20 may comprise another plant varietal suitable for indoor farming. Plants may have nutrients delivered via different techniques (e.g. hydroponics, aquaponics, aeroponics, etc.). Plants 20 may be grown in a substrate medium that could be natural or synthetic (e.g. soil, rock wool, peat moss, coconut coir, perlite, vermiculite, clay pebbles, rock lava, rocks, polymer-based mediums, etc.).

Lights 40 may comprise any suitable lights which produce photosynthetically active photons. Lights 40 may comprise full spectrum lights. Lights 40 may comprise LED lights. When lights 40 are turned on, lights 40 may produce heat. The heat output of lights 40 may be approximately proportionate to the intensity of the light output of lights 40.

In the illustrated embodiments, two lights 40 are provided for each plant 20. This not mandatory. A greater or lesser number of lights 40 per plant 20 may be provided. Each light 40 may correspond to one or more plants 20 and each plant 20 may correspond to one or more lights 40. In other words, one light 40 may provide photons to a plurality of plants and/or each plant may receive photons from a plurality of lights.

To better control which lights 40 deliver photons to which plants 20, one or more dividers, walls, curtains or the like may be provided. For example, one or more dividers, walls, curtains or the like may be provided between racks 30 to prevent lights 40 on a first rack 30 from undesirably providing photons to plants 20 on a second rack 30. Similarly, one or more dividers, walls, curtains or the like may be provided between rows 32 to prevent lights 40 on a first row 32 from undesirably providing photons to plants 20 on a second row 32. Such dividers, walls, curtains or the like could even be provided within rows 32 to separate plants 20 and lights 40 within a row 32.

Grow room 10 may be enclosed so as to prevent natural light or other exterior light from entering grow room 10. The walls, windows and/or ceiling of grow room 10 may be covered at least in part in a reflective material such as panda film and/or insulating elements (e.g. insulation panels).

Returning to FIG. 1, method 100 comprises a first step 110 of obtaining or determining the desired total light integral ("TLI") for each plant 20 within grow room 10. Like DLI, TLI may be used to understand and evaluate the quantity of light a plant is receiving. Like DLI, TLI is a cumulative measure of photosynthetically active radiation ("PAR"). TLI may be defined as the quantity of photosynthetically active photons received by plants per area for a given time period. Unlike, DLI which is limited to a 24 hour time period, the TLI may provide a measure of the quantity of light received by plants per area for a time period other than 24 hours. However, where the time period is 24 hours, the TLI would be equal to the DLI. The TLI may be determined based at least in part on the DLI. The DLI and/or TLI for each plant 20 may be obtained at step 110 by any suitable method. For example, the DLI and/or TLI may be obtained through pre-existing sources of such information or through experimentation. In some embodiments, the PPFD and/or photoperiod may also be obtained or determined at step 110.

In some embodiments, the DLI for each plant 20 within grow room 10 will be the same or similar (e.g. each plant 20 with grow room 10 will be of the same varietal or varietals having the same or similar DLI and/or TLI), but this is not mandatory. Different plant varietals having different DLIs, TLIs, photoperiods and/or PPFDs may be provided within grow room 10 and/or different plant varietals having the same or similar DLIs, TLIs, photoperiods and/or PPFDs may be provided within grow room 10.

At step 120, each plant 20 is separated into a group 50. While plants 20 in a group 50 may be physically separated from plants 20 in other groups 50, this is not mandatory. Instead, plants 20 may be nominally separated into groups 50 such that plants 20 from one group 50 may be spread out in the x, y and/or z-directions within grow room 10 and/or separated from each other by plants 20 of other groups 50.

The plants 20 of each group 50 may be chosen to achieve the following characteristics:

each plant 20 in a group 50 has the same (or similar) photoperiod; and the sum of the PPFD for all plants 20 in a group 50 is the same (or similar) for all groups 50.

To achieve the above-noted characteristics of each group 50, plants 20 may be separated into groups 50 based on a number of factors. For example, each plant 20 may be separated into groups 50 based on one or more of:

the plant's DLI;

the plant's TLI;

the plant's photoperiod;

the plant's PPFD;

the plant's varietal;

the plant's location within grow room 10;

the total number of plants 20 within grow room 10;

etc.

Groups 50 may be chosen such that plants 20 within a group 50 each have a photoperiod within 20% of each other, 10% of each other, 5% of each other or less. In this way, if all plants 20 within each group 50 are provided with light at the same time, no plant in group 50 will receive too many or too few hours of light.

Groups 50 may be chosen such that plants 20 within a group 50 each have a PPFD within 20% of each other, 10% of each other, 5% of each other or less. In this way, if all plants 20 within each group 50 are provided with the same intensity of light, no plant in group 50 will receive light that is too intense or not intense enough.

By arranging groups 50 such that the sum of the PPFD for all plants 20 in a group 50 is the same (or similar) for all groups 50, energy consumption (e.g. to power lights) and heat output (e.g. from the lights) for each group 50 may be approximately consistent. This maintenance of approximately consistent light (and heat) output all day may reduce temperature fluctuations within grow room 10 and reduce overall energy consumption. For example, by reducing temperature fluctuations within grow room 10 due to heat generated from lights 40, the usage of heating and cooling may be reduced thereby reducing energy usage and even capital costs necessary to build grow room 10. Further, by maintaining more consistent temperatures within grow room 10, less energy may be required for maintaining a desired humidity within grow room 10. This effect may be rather substantial since more energy is required to remove moisture from cool air than from warm air and therefore avoiding coldspots or colder periods of time may be particularly advantageous.

Groups 50 may be chosen such that plants 20 within a group 50 each have a DLI within 20% of each other, 10% of each other, 5% of each other or less. Groups 50 may be chosen such that plants 20 within a group 50 each have a TLI within 20% of each other, 10% of each other, 5% of each other or less. In this way, if all plants 20 within each group 50 are provided with the same quantity of light, no plant in group 50 will receive too much or too little light.

To simplify achieving the above-noted characteristics of each group 50, each group 50 could comprise an approximately equal number of plants 20 of a single varietal. This is not mandatory. Instead, groups 50 could be arranged with multiple varietals of plants 20 and different numbers of plants 20. The number, N, of plants 20 in each group 50 may be any suitable number. In some embodiments, the number, N, of plants in each group 50 is chosen to achieve groups 50 with approximately equal rates of heat output during the photoperiod of the plant (e.g. with approximately equal sums of the PPFD for all plants 20 in a group 50). For example, if plants 20 of a first group 50 of plants 20 each benefit from a relatively lower PPFD (with relatively lower heat output per light 40) as compared to plants 20 of a second group 50, then the first group 50 may be chosen to have a greater number, N, of plants 20 as compared to the second group 50 to achieve similar cumulative rates of heat output per group 50. Put differently, if the PPFD of each plant 20 of the first group 50 is represented by $a_1$ and the PPFD of each plant 20 of the second group 50 is represented by $a_2$ where the first group has $N_1$ plants 20 and the second group has $N_2$ plants 20, then the number, $N_1$, of plants 20 in the first group 20 may be determined approximately as follows:

$$N_1 \approx \frac{a_2 N_2}{a_1}$$

At step 120, plants 20 may be separated into any number, n, of groups 50. In some embodiments, the number, n, of groups 50 is based at least in part on the photoperiod(s) of plants 20. In some embodiments, the sum of the photoperiods of all groups 50 is approximately equal to or greater than a time period, t. For practical reasons, the time period, t, may be 24 hours but this is not mandatory. For example, if the photoperiod of plants 20 in each group 50 is six hours, it may be desirable for the number, n, of groups 50 to be a multiple of four. With four groups and a photoperiod of six hours, each group 50 may be provided with its DLI in series in a 24 hour period.

In some embodiments, plants 20 in each group 50 are spread throughout grow room 10 in the x, y and/or z-directions. Spreading plants 20 of a group 50 around grow room 10 may facilitate even heat output of lights 40 around grow room 10. As compared to arranging plants 20 of a group 50 together, spreading plants 20 of a group 50 throughout grow room 10 may reduce undesirable hot spots (e.g. where there is a greater concentration of lights 40 operating at a specific time in one area of grow room 10 than in other areas) and/or cool spots (e.g. where there is a lesser concentration of lights 40 operating at a specific time in one area of grow room 10 than in other areas).

Plants 20 in each group 50 may be spread out by alternating racks 30 and/or rows 32 within racks 30 into different groups 50. For example, every second rack 30 could be a in a first group 50 while every remaining rack 30 is in a second group 50. As another example, every second row 32 of every rack 30 may be in a first group 50 while the remaining rows 32 are in a second group 50.

To facilitate spreading plants 20 within a group 50 throughout grow room 10, grow room 10 may be nominally separated into sections 12. In the FIG. 2 embodiment, room 10 is nominally separated into four sections 12 (section A, section B, section C and section D), each having four racks 30. It should be understood that a grow room 10 may be nominally separated into any number of sections 12, each having one or more racks 30 or portions of racks 30. While sections 12 are depicted as being rectangular, this is not mandatory and sections 12 may be of any shape. The number, size and shape of sections 12 may be dependent on the size and/or shape of grow room 10 and/or the size, shape and/or number of racks 30.

While sections 12 are depicted as including entire racks 30, this is not mandatory. Instead, a first portion of a rack 30 may be part of a first section 12 while a second part of a rack may be part of a second section 12. For example, a section 12 could include the first rows 32-1 of some or all of the racks 30 in a grow room 10 or a section 12 could include all of the even number rows 32-2, 32-4, etc. of some or all of the racks 30 in a grow room 10. Similarly, while sections 12 are depicted and/or described as including entire rows 32 of racks 30, this is not mandatory. Instead, different portions of rows could be part of different section 12. For example, a first portion of a row 32 may be part of a first section 12 while a second portion of a row 32 may be part of a second section 12.

To achieve a desired spread of plants 20 in each group 50 throughout grow room 10, plants 20 may be picked from each section 12. For example, each group 50 may comprise an equal or approximately equal number of plants 20 from each section 12.

A similar principle may be applied to achieve a desired spread of plants 20 in each group 50 at different heights. For example, each group 20 may have at least one plant at every row 32 height or in alternating rows heights.

At step 130, the desired TLI is provided to each plant 20 over the course of a time period, t, by sequentially providing light to each group 50. The desired TLI for each plant is provided sequentially on a group-by-group basis. In some embodiments, light is provided sequentially to each group of plants 50 in a sequence that maintains the sum of PPFD in grow room 10 approximately constant throughout time period, t. Time period, t, may be a 24 hour time period but this is not mandatory. In some embodiments, lights 40 of only a single group 50 is on at any given time during time period, t, such that the sum of the PPFD in grow room 10 for any given time during time period, t, is approximately consistent. In other embodiments, lights 40 for multiple groups may be on at the same time. In such cases, the photoperiod for a first group 50 may overlap (in part or in whole) with the photoperiod of one or more other groups 50. Where the photoperiods of groups 50 overlap, the sequence may be chosen such that the sum of the PPFD in grow room 10 for any given time during time period, t, is approximately consistent by maintaining consistent overlap between groups 50 receiving light. For example, if two groups 50 overlap at a given time during time period, t, then the sequence may be arranged such that two groups 50 substantially always (e.g. except for brief periods between photoperiods or otherwise) overlap during time period, t.

The schedule for sequentially providing light to groups 20 may be determined based on a number of factors to achieve an approximately constant cumulative heat output throughout time period, t (e.g. by maintaining an approximately constant sum of PPFD within grow room 10 throughout time period, t). In some embodiments, the total time of the photoperiods of groups 50 is approximately equal to the time period, t. In such embodiments, lights 40 for each group may be turned on sequentially for their corresponding photoperiod in series. In some embodiments, the total time of the photoperiods of groups 50 is less than the time period, t. In such cases, there may be short periods of time with no lights on. These short periods of time with no lights on may be spaced apart during time period, t, to reduce the effect of such time periods on the temperature within grow room 10. An alternate heat source may be turned on (or turned up) during these short periods of time with no lights on. In some embodiments, where an alternative heat source is also used while the lights are on, the heat output of the alternative heat source may be increased during these short periods of time with no lights on (relative to when the lights are on). In some embodiments, the total time of the photoperiods of groups 50 is greater than the time period, t. In such cases, there may be overlap (in whole or in part) of photoperiods of different groups 50.

In some embodiments, rather than provide lights 40 that are turned on for some periods of time and turned off for other periods of time, a smaller number of lights 40 that are always turned on (or turned on most of the time) is employed by moving lights 40 from group 50 to group 50 and/or moving groups 50 to lights 40. By moving lights 40 and/or plants 20, the same number of lights 40 may be turned on at all times which may result in a approximately constant rate of heat output from lights 40.

Plants 20 may be placed on a conveyor system (e.g. a conveyor belt, a hanging conveyor, a water-based conveyor or the like). Plants 20 in a group 50 may then be moved under lights 40 to achieve the desired TLI and then moved away from lights 40 when the desired TLI is achieved to make way for another group 50 of plants 20. The achieved TLI of plants 20 may therefore be controlled by the speed or interval at which they are moved under lights 40, the intensity of lights 40, etc.

Lights 40 may be placed on a conveyor system (e.g. a hanging conveyor or the like). Lights 40 may then be moved over a group 50 of plants 20 to achieve the desired TLI and then moved away from that group 50 when the desired TLI is achieved. Lights 40 may then be moved over another group 50 of plants 20. The achieved TLI of plants 20 may therefore be controlled by the speed or interval at which lights 40 are moved, the intensity of lights 40, etc.

In some embodiments, both lights 40 and plants 20 are arranged to be moveable to facilitate providing the desired TLI to plants 20.

To better illustrate method 100, a series of exemplary scenarios for grow room 10 are provided. These scenarios are meant to be illustrative only and are not intended to limit method 100 in any way. For the purpose of simplifying the following scenarios, it may be assumed that each row 32 of each rack 30 comprises the same number of plants 20 and the same number of lights 40. However, it should be understood that in practice, each row 32 may have different numbers of plants 20 and/or lights 40. Moreover, while the following scenarios are based on grow room 10 for FIGS. 2 and 3, it should be understood that the scenarios could be modified for different grow rooms 10 described herein or otherwise. Further, while each of the following scenarios rely on turning lights 40 on and off, it should be understood that lights 40 and/or plants 20 could be moveable to avoid turning lights on and off.

Exemplary Scenario 1

In a first exemplary scenario, all plants 20 have a same or similar TLI and have a photoperiod of 12 hours. Plants 20 are nominally separated into a first group comprising all of plants 20 within racks A1, A3, B1, B3, C1, C3, D1 and D3 and a second group comprising all of plants 20 within racks A2, A4, B2, B4, C2, C4, D2 and D4. In this way, there is an approximately equal number of plants 20 of each group 50 in each section 12 and at each row height.

A time period, t, of 24 hours is separated into a first sub-period of 12 hours and a second sub-period of 12 hours. During the first sub-period, lights 40 for the first group of plants 20 are turned on while lights 40 for the second group of plants 20 are turned off. During the second sub-period, lights 40 for the second group of plants 20 are turned on while lights 40 for the first group of plants 20 are turned off.

In the first exemplary scenario, the same number of lights 40 are turned on with the same intensity at all times during time period, t. Moreover, since plants 20 of each of the first and second groups 50 are spread apart around grow room 10 (in the x, y and z-directions), a likelihood of hotspots (due to heat from lights 40 that are turned on) or coldspots (due to a lack of heat from lights 40 that are turned off) within grow room 10 is reduced.

Exemplary Scenario 2

In a second exemplary scenario, all plants 20 have a same or similar TLI and have a photoperiod of 12 hours. Plants 20 are nominally separated into a first group comprising all of plants 20 within even-numbered rows of racks (e.g. all plants on rows 32-2 and 32-4 in grow room 10) and a second group comprising all of plants 20 within odd-numbered rows racks (e.g. all plants on rows 32-1 and 32-3 in grow room 10). In this way, there is an approximately equal number of plants 20 of each group 50 in each section 12 and at each row height.

A time period, t, of 24 hours is separated into a first sub-period of 12 hours and a second sub-period of 12 hours. During the first sub-period, lights 40 for the first group of plants 20 are turned on while lights 40 for the second group of plants 20 are turned off. During the second sub-period, lights 40 for the second group of plants 20 are turned on while lights 40 for the first group of plants 20 are turned off.

In the second exemplary scenario, the same number of lights 40 are turned on with the same intensity at all times during time period, t. Moreover, since plants 20 of each of the first and second groups 50 are spread apart around grow room 10 (in the x, y and z-directions), a likelihood of hotspots (due to heat from lights 40 that are turned on) or coldspots (due to a lack of heat from lights 40 that are turned off) within grow room 10 is reduced.

Exemplary Scenario 3

In a third exemplary scenario, all plants 20 have a same or similar TLI and have a photoperiod of 6 hours. Plants 20 are nominally separated into a first group comprising all plants 20 on rows 32-1 and 32-3 of racks A1, A3, B1, B3, C1, C3, D1 and D3, a second group comprising all plants 20 on rows 32-2 and 32-4 of racks A1, A3, B1, B3, C1, C3, D1 and D3, a third group comprising all plants 20 on rows 32-1 and 32-3 of racks A2, A4, B2, B4, C2, C4, D2 and D4 and a fourth group comprising all plants 20 on rows 32-2 and 32-4 of racks A2, A4, B2, B4, C2, C4, D2 and D4. In this way, there is an approximately equal number of plants 20 of each group 50 in each section 12 and at each row height.

A time period, t, of 24 hours is separated into a first sub-period of 6 hours, a second sub-period of 6 hours, a third sub-period of 6 hours and a fourth sub-period of 6 hours. During the first sub-period, lights 40 for the first group of plants 20 are turned on while lights 40 for the second, third and fourth groups of plants 20 are turned off. During the second sub-period, lights 40 for the second group of plants 20 are turned on while lights 40 for the first, third and fourth groups of plants 20 are turned off. During the third sub-period, lights 40 for the third group of plants 20 are turned on while lights 40 for the first, second and fourth groups of plants 20 are turned off. During the fourth sub-period, lights 40 for the fourth group of plants 20 are turned on while lights 40 for the first, second and third groups of plants 20 are turned off.

As in the first exemplary scenario, the same number of lights 40 are turned on with the same intensity at all times during time period, t. Moreover, since plants 20 of each of the first, second, third and fourth groups 50 are spread apart around grow room 10 (in the x, y and z-directions), a likelihood of hotspots (due to heat from lights 40 that are turned on) or coldspots (due to a lack of heat from lights 40 that are turned off) within grow room 10 is reduced.

Exemplary Scenario 4

In a fourth exemplary scenario, all plants 20 have a same or similar TLI and have a photoperiod of 12 hours. Plants 20 are nominally separated into a first group comprising all plants 20 on rows 32-1 of all racks in grow room 10, a second group comprising a all plants 20 on rows 32-2 of all racks in grow room 10, a third group comprising all plants 20 on rows 32-3 of all racks in grow room 10 and a fourth group comprising all plants 20 on rows 32-4 of all racks in grow room 10. In this way, there is an approximately equal number of plants 20 of each group 50 in each section 12.

A time period, t, of 24 hours is separated into a first sub-period of 6 hours, a second sub-period of 6 hours, a third sub-period of 6 hours and a fourth sub-period of 6 hours. During the first sub-period, lights 40 for the first and fourth groups of plants 20 are turned on while lights 40 for the second, and third groups of plants 20 are turned off. During the second sub-period, lights 40 for the first and second groups of plants 20 are turned on while lights 40 for the third and fourth groups of plants 20 are turned off. During the third sub-period, lights 40 for the second and third groups of plants 20 are turned on while lights 40 for the first and fourth groups of plants 20 are turned off. During the fourth sub-period, lights 40 for the third and fourth groups of plants 20 are turned on while lights 40 for the first and second groups of plants 20 are turned off.

As in the first exemplary scenario, the same number of lights 40 are turned on with the same intensity at all times during time period, t. Moreover, since plants 20 of each of the first, second, third and fourth groups 50 are spread apart around grow room 10 (in the x and y-directions), a likelihood of hotspots (due to heat from lights 40 that are turned on) or coldspots (due to a lack of heat from lights 40 that are turned off) within grow room 10 is reduced.

Exemplary Scenario 5

In a fifth exemplary scenario, plants 20 are of two different varietals. The TLI for each plant is approximately equal but the first plant varietal has a photoperiod of 12 hours and the second varietal has a photoperiod of 6 hours. Plants 20 are nominally separated into a first group comprising plants 20 of the first varietal arranged on rows racks A1, B1, C1 and D1, a second group comprising plants 20 of the first varietal arranged on racks A2, B2, C2 and D2, a third group comprising plants 20 of the second varietal arranged on rows 32-1 and 32-3 of racks A3, B3, C3 and D3, a fourth group comprising plants 20 of the second varietal arranged on rows 32-2 and 32-4 of racks A3, B3, C3 and D3, a fifth group comprising plants 20 of the second varietal arranged on rows 32-1 and 32-3 of racks A4, B4, C4 and D4 and a sixth group comprising plants 20 of the second varietal arranged on rows 32-2 and 32-4 of racks A4, B4, C4 and D4.

A time period, t, of 24 hours is separated into a first sub-period of 6 hours, a second sub-period of 6 hours, a third sub-period of 6 hours and a fourth sub-period of 6 hours. During the first sub-period, lights 40 for the first and third groups of plants 20 are turned on while lights 40 for the second, fourth, fifth and sixth groups of plants 20 are turned off. During the second sub-period, lights 40 for the first and fourth groups of plants 20 are turned on while lights 40 for the third, fourth, fifth and sixth groups of plants 20 are turned off. During the third sub-period, lights 40 for the second and fifth groups of plants 20 are turned on while lights 40 for the first, third, fourth and sixth groups of plants 20 are turned off. During the fourth sub-period, lights 40 for the second and sixth groups of plants 20 are turned on while lights 40 for the first, third, fourth and fifth groups of plants 20 are turned off.

Despite the presence of multiple varietals with different photoperiods, the same number of lights 40 are turned on with the same intensity at all times during time period, t. Moreover, since plants 20 of each of the first, second, third and fourth groups 50 are spread apart around grow room 10 (in the x, y and z-directions), a likelihood of hotspots (due to heat from lights 40 that are turned on) or coldspots (due to a lack of heat from lights 40 that are turned off) within grow room 10 is reduced.

Exemplary Scenario 6

In a sixth exemplary scenario, plants 20 are of two different varietals. The first plant varietal has a PPFD of half that of the second varietal. Both varietals have a photoperiod of 8 hours. Plants 20 are nominally separated into a first group comprising plants 20 of the first varietal arranged on rows 32-1 and 32-3 of all racks in grow room 10, a second group comprising plants 20 of the second varietal arranged on rows 32-2 of all racks in grow room 10 and a third group comprising plants 20 of the second varietal arranged on rows 32-4 of all racks in grow room 10.

A time period, t, of 24 hours is separated into a first sub-period of 8 hours, a second sub-period of 8 hours and a third sub-period of 8 hours. During the first sub-period, lights 40 for the first group of plants 20 are turned on while lights 40 for the second and third groups of plants 20 are turned off. During the second sub-period, lights 40 for the second group of plants 20 are turned on while lights 40 for the first and third groups of plants 20 are turned off. During the third sub-period, lights 40 for the third group of plants 20 are turned on while lights 40 for the first and second groups of plants 20 are turned off.

Despite the presence of multiple varietals with different PPFDs, and different numbers of lights 40 turned on at different times during time period, t, the cumulative heat output of lights 40 is maintained approximately constant by having half the number of lights at twice the intensity during the second and third sub-periods as compared to the first sub-period. Moreover, since plants 20 of each of the first, second, third and fourth groups 50 are spread apart around grow room 10 (in the x, y and/or z-directions), a likelihood of hotspots (due to heat from lights 40 that are turned on) or coldspots (due to a lack of heat from lights 40 that are turned off) within grow room 10 is reduced.

Interpretation of Terms

Unless the context clearly requires otherwise, throughout the description and the claims:
  "comprise", "comprising", and the like are to be construed in an inclusive sense, as opposed to an exclusive or exhaustive sense; that is to say, in the sense of "including, but not limited to";
  "connected", "coupled", or any variant thereof, means any connection or coupling, either direct or indirect, between two or more elements; the coupling or connection between the elements can be physical, logical, or a combination thereof; elements which are integrally formed may be considered to be connected or coupled;
  "herein", "above", "below", and words of similar import, when used to describe this specification, shall refer to this specification as a whole, and not to any particular portions of this specification;
  "or", in reference to a list of two or more items, covers all of the following interpretations of the word: any of the items in the list, all of the items in the list, and any combination of the items in the list;
  the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The invention claimed is:

1. A method of providing light to plants, the method comprising:
  providing a plurality of groups of plants within a space, the plurality of groups of plants comprising a first group of plants and a second group of plants, wherein plants of the first group of plants are spaced apart from plants of the second group of plants;
  providing a plurality of lights within the space, the plurality of lights comprising a first group of lights and a second group of lights wherein the first group of lights is arranged to provide light to the first group of plants and the second group of lights is arranged to provide light to the second group of plants;
  sequentially providing light to the plurality of groups of plants during a 24 hour time period according to a sequence by providing light to the first group of plants from the first group of lights for a first sub-period of the time period and providing light to the second group of plants from the second group of lights for a second sub-period of the time period;
  wherein a cumulative rate of heat output of the first group of lights during the first sub-period of the time period is approximately equal to a cumulative rate of heat output of the second group of lights during the second sub-period of the time period such that a cumulative rate of heat output of the plurality of lights within the space is approximately constant during the time period.

2. The method according to claim 1 wherein the first group of lights is arranged to provide photons substantially only to the first group of plants and the second group of lights is arranged to provide photons substantially only to the second group of plants.

3. The method according to claim 1 wherein the first and second sub-periods are approximately equal in length.

4. The method according to claim 1 wherein the first and second sub-periods have different lengths.

5. The method according to claim 1 wherein a sum of lengths of the first and second sub-periods is substantially equal to 24 hours.

6. The method according to claim 1 wherein each group of lights is turned on only once during the time period.

7. The method according to claim 1 wherein one or more of the first and second groups of lights is turned on multiple times during the 24 hour time period.

8. The method according to claim 1 wherein:
the plurality of groups of plants comprises a third group of plants wherein plants of the third group of plants are spaced apart from plants of the first and second groups of plants;
the plurality of lights comprise a third group of lights arranged to provide light to the third group of plants; and
sequentially providing light to the plurality of groups of plants during the 24 hour time period according to the sequence further comprises providing light to the third group of plants from the third group of lights for a third sub-period of the time period.

9. The method according to claim 8 wherein a sum of lengths of the first, second and third sub-periods is substantially equal to 24 hours.

10. The method according to claim 8 wherein the first sub-period temporally overlaps in part with the second sub-period and the second sub-period overlaps in part with the third sub-period.

11. The method according to claim 1 wherein sequentially providing light to the first and second groups of plants during the time period comprises:
for the first sub-period, selectively turning on the first group of lights and selectively turning off the second group of lights; and
for the second sub-period, selectively turning on the second group of lights and selectively turning off the first group of lights.

12. The method according to claim 1 wherein the first group of plants is arranged across a first row of a first rack and a first row of a second rack and the second group of plants is arranged across a second row of the first rack and a second row of the second rack.

13. The method according to claim 12 wherein the first row of the first rack is located at a same height as the first row of the second rack and the second row of the first rack is located at a same height as the second row of the second rack.

14. The method according to claim 1 wherein the first and second groups of plants are arranged in a row of racks and the plants of every second rack of the row of racks are plants of the second group of plants and the plants of every first rack of the row of racks are plants of the first group of plants.

15. The method according to claim 1 wherein plants of the first and second groups of plants are evenly distributed throughout the space.

16. The method according to claim 1 wherein the space is enclosed to substantially prevent external light from entering the space.

17. The method according to claim 1 wherein for each of the first and second groups of plants, a photoperiod of the plants of said group varies by less than 20%.

18. The method according to claim 1 wherein a total photosynthetic photon flux density ("PPFD") for the first group of plants during the first sub-period varies by less than 20% as compared to a total PPFD for the second group of plants during the second sub-period.

19. The method according to claim 1 wherein for each of the first and second groups of plants, a daily light integral ("DLI") of the plants of said group varies by less than 20%.

20. The method according to claim 1 wherein the first group of plants comprises at least two different plant varietals.

21. The method according to claim 1 wherein the first group of plants consists of a single plant varietal.

* * * * *